United States Patent
Hoshiya

(10) Patent No.: US 9,798,940 B2
(45) Date of Patent: Oct. 24, 2017

(54) VEHICULAR IMAGE PROCESSING APPARATUS

(71) Applicant: DENSO CORPORATION, Kariya, Aichi-pref. (JP)

(72) Inventor: Kazumichi Hoshiya, Kariya (JP)

(73) Assignee: DENSO CORPORATION, Kariya (JP)

(*) Notice: Subject to any disclaimer, the term of this patent is extended or adjusted under 35 U.S.C. 154(b) by 174 days.

(21) Appl. No.: 14/428,060

(22) PCT Filed: Oct. 8, 2013

(86) PCT No.: PCT/JP2013/005995
§ 371 (c)(1),
(2) Date: Mar. 13, 2015

(87) PCT Pub. No.: WO2014/068858
PCT Pub. Date: May 8, 2014

(65) Prior Publication Data
US 2015/0254517 A1 Sep. 10, 2015

(30) Foreign Application Priority Data
Oct. 30, 2012 (JP) ................. 2012-238439

(51) Int. Cl.
*B60K 28/06* (2006.01)
*G06K 9/00* (2006.01)
(Continued)

(52) U.S. Cl.
CPC ........ *G06K 9/00845* (2013.01); *B60K 28/066* (2013.01); *G06K 9/00* (2013.01);
(Continued)

(58) Field of Classification Search
CPC .... B60K 28/066; G06K 9/00; G06K 9/00845; G06K 9/2027; G08B 21/06; G08B 29/24;
(Continued)

(56) References Cited

U.S. PATENT DOCUMENTS 9,294,681 B2 *  3/2016  Murao .................. G06K 9/2054
9,654,697 B2 *  5/2017  Takenaka ............. H04N 5/2357
(Continued)

FOREIGN PATENT DOCUMENTS

| JP | 2003-060984 A | 2/2003 |
| JP | 2009-017474 A | 1/2009 |
| WO | 2012/172842 A1 | 12/2012 |

OTHER PUBLICATIONS

International Search Report and Written Opinion of the International Searching Authority dated Jan. 7, 2014 in the corresponding PCT application No. PCT/JP2013/005995 (and English translation).

*Primary Examiner* — Christopher S Kelley
*Assistant Examiner* — Deirdre Beasley
(74) *Attorney, Agent, or Firm* — Posz Law Group, PLC

(57) ABSTRACT

There are provided an image capture portion, a luminance acquisition section, a luminance estimation section, and a capture mode setup section. The image capture portion cyclically captures a vehicle compartment. The luminance acquisition section acquires the luminance of a captured image captured by the image capture portion. The luminance estimation section estimates a cyclic change in the luminance of captured images to be captured subsequently. The capture mode setup section settles a capture mode for the image capture portion based on a result of estimating the cyclic change in the luminance of captured images.

11 Claims, 5 Drawing Sheets

(51) Int. Cl.
*G06K 9/20* (2006.01)
*H04N 5/232* (2006.01)
*H04N 5/235* (2006.01)
*H04N 5/353* (2011.01)
*H04N 7/18* (2006.01)
*H04N 5/225* (2006.01)
*H04N 5/238* (2006.01)
*G08B 21/06* (2006.01)
*G08B 29/24* (2006.01)

(52) U.S. Cl.
CPC ........... *G06K 9/2027* (2013.01); *G08B 21/06* (2013.01); *G08B 29/24* (2013.01); *H04N 5/225* (2013.01); *H04N 5/235* (2013.01); *H04N 5/238* (2013.01); *H04N 5/2353* (2013.01); *H04N 5/2355* (2013.01); *H04N 5/2357* (2013.01); *H04N 5/23219* (2013.01); *H04N 5/3532* (2013.01); *H04N 7/18* (2013.01)

(58) Field of Classification Search
CPC .... H04N 5/225; H04N 5/23219; H04N 5/235; H04N 5/2353; H04N 5/2355; H04N 5/2357; H04N 5/238; H04N 5/3532; H04N 7/18
USPC ......................................................... 348/119
See application file for complete search history.

(56) References Cited

U.S. PATENT DOCUMENTS

| | | | | |
|---|---|---|---|---|
| 2003/0107664 | A1* | 6/2003 | Suzuki | H04N 5/235 348/296 |
| 2004/0227814 | A1* | 11/2004 | Choi | B60R 1/00 348/148 |
| 2005/0225645 | A1* | 10/2005 | Kaku | G06T 7/20 348/208.99 |
| 2005/0259177 | A1* | 11/2005 | Senoo | H04N 5/2352 348/362 |
| 2006/0018641 | A1* | 1/2006 | Goto | B60R 25/1004 396/4 |
| 2006/0152598 | A1* | 7/2006 | Kawarada | H04N 5/23248 348/226.1 |
| 2009/0082001 | A1* | 3/2009 | Rahul | H04M 1/72572 455/418 |
| 2009/0174809 | A1* | 7/2009 | Mochida | G03B 7/28 348/362 |
| 2009/0197584 | A1* | 8/2009 | Snow | H04M 1/72577 455/418 |
| 2010/0033619 | A1* | 2/2010 | Kimura | G03B 7/08 348/364 |
| 2010/0231712 | A1* | 9/2010 | Suenobu | H04N 5/23219 348/135 |
| 2010/0253495 | A1* | 10/2010 | Asano | A61B 5/18 340/439 |
| 2011/0102664 | A1* | 5/2011 | Chuang | G03B 7/16 348/370 |
| 2011/0292241 | A1* | 12/2011 | Segapelli | H04N 5/2357 348/226.1 |
| 2012/0002074 | A1* | 1/2012 | Baba | H04N 5/235 348/228.1 |
| 2012/0154629 | A1* | 6/2012 | Horiuchi | H04N 7/0127 348/226.1 |
| 2012/0162424 | A1* | 6/2012 | Murao | G06K 9/2054 348/148 |
| 2012/0162426 | A1* | 6/2012 | Murao | H04N 5/235 348/148 |

* cited by examiner

VEHICULAR IMAGE PROCESSING APPARATUS

CROSS REFERENCE TO RELATED APPLICATIONS

The present disclosure is a U.S. national stage application of PCT/JP2013/005995 filed on Oct. 8,2013 and is based on Japanese Patent Application No. 2012-238439 filed on Oct. 30, 2012, the disclosures of which are incorporated herein by reference.

TECHNICAL FIELD

The present disclosure relates to a vehicular image processing apparatus.

BACKGROUND ART

There is a need to determine whether or not a driver is inattentive or falls asleep at the wheel while driving. For this purpose, a process is performed to read a face orientation or an eye state from the driver's face image and raise an alarm as needed. However, a vehicle moves and a light environment to capture the driver varies accordingly. As a result, a face image is too dark or causes halation. Accurately analyzing the face image is difficult, making it impossible to accurately read face states (e.g., face orientation, visual line direction, and eye opening or closing state). Such a condition, if continued, may make it difficult to appropriately raise an alarm.

Therefore, there is proposed a camera-equipped portable information terminal apparatus (see Patent Literature 1) that can identify the commercial power frequency used for a region and automatically prevent a flicker from occurring.

There is proposed a camera (see Patent Literature 2) that varies the frame rate of an image capturing apparatus according to an illumination frequency or brightness and thereby enables to prevent a flicker and adjust the amount of light without using an electronic shutter.

There is proposed an onboard image processing apparatus (see Patent Literature 3) capable of providing an appropriate alarm regardless of changes in a light environment to capture a driver.

There is proposed an image processing apparatus (see Patent Literature 4) capable of acquiring a clearly captured image regardless of light and dark around an object to be captured.

PRIOR ART LITERATURES

Patent Literature

Patent Literature 1: JP 2003-060984 A
Patent Literature 2: JP 2002-165141 A
Patent Literature 3: JP 2009-116742 A
Patent Literature 4: JP 2009-017474 A The configurations described in Patent Literatures 1 and 2 vary the frame rate of an image capturing apparatus according to an illumination frequency or brightness and cannot solve changes in the light environment due to the vehicle movement because a vehicle moves as described above.

The configuration described in Patent Literature 3 varies the exposure time or the aperture of a camera according to the brightness of a face image. This complicates the exposure process and increases camera costs because a variable aperture mechanism is needed.

The configuration described in Patent Literature 4 identifies light and dark of a captured image based on current location information from a navigation apparatus. The configuration requires the navigation apparatus or an apparatus to acquire current location information, increasing costs.

SUMMARY OF INVENTION

A cyclic light-dark change occurs corresponding to a travel speed when a vehicle travels across shadows formed by bridge piers, streetlights on an expressway, or similar structures placed at approximately equal intervals near a road. A captured image repeats light and dark at a slow cycle if the light-dark cycle is approximate to a multiple of the cycle of capture (exposure). Therefore, the configuration of Patent Literature 4 is appropriate for structures such as a tunnel causing a light-dark change at a relatively long light-dark cycle but is inappropriate for the other structures.

It is an object of the present disclosure to provide a vehicular image processing apparatus capable of acquiring an image appropriate for analysis at low cost regardless of changes in a light environment.

To achieve the above object, according to an aspect of the present disclosure, a vehicular image processing apparatus is provided to include an image capture portion, a luminance acquisition section, a luminance estimation section, and a capture mode setup section. The image capture portion cyclically captures a vehicle compartment of a vehicle. The luminance acquisition section acquires luminance of a captured image captured by the image capture portion. The luminance estimation section performs, based on a chronological change in the luminance, an estimation of a cyclical change in luminance of a captured image that is to be captured subsequently by the image capture portion. The capture mode setup section settles a capture mode for the image capture portion based on a result of the estimation of the cyclical change in luminance of the captured image.

The above-mentioned configuration can prevent occurrence of a phenomenon in which the captured image repeats light and dark at a slow cycle as described above. The configuration can also reduce uneven captured image luminance, acquire many images appropriate for the analysis, and provide a stable recognition result. For example, the prior art needs to measure a cycle of light and dark due to shadows resulting from structures along a road and investigate the relationship between the light-dark cycle and a capture cycle. However, the above-mentioned configuration can estimate the relationship between the light-dark cycle and a capture cycle based on changes in the captured image luminance. As a result, it is possible to prevent the capture cycle from approximating a multiple of the light-dark cycle.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1:
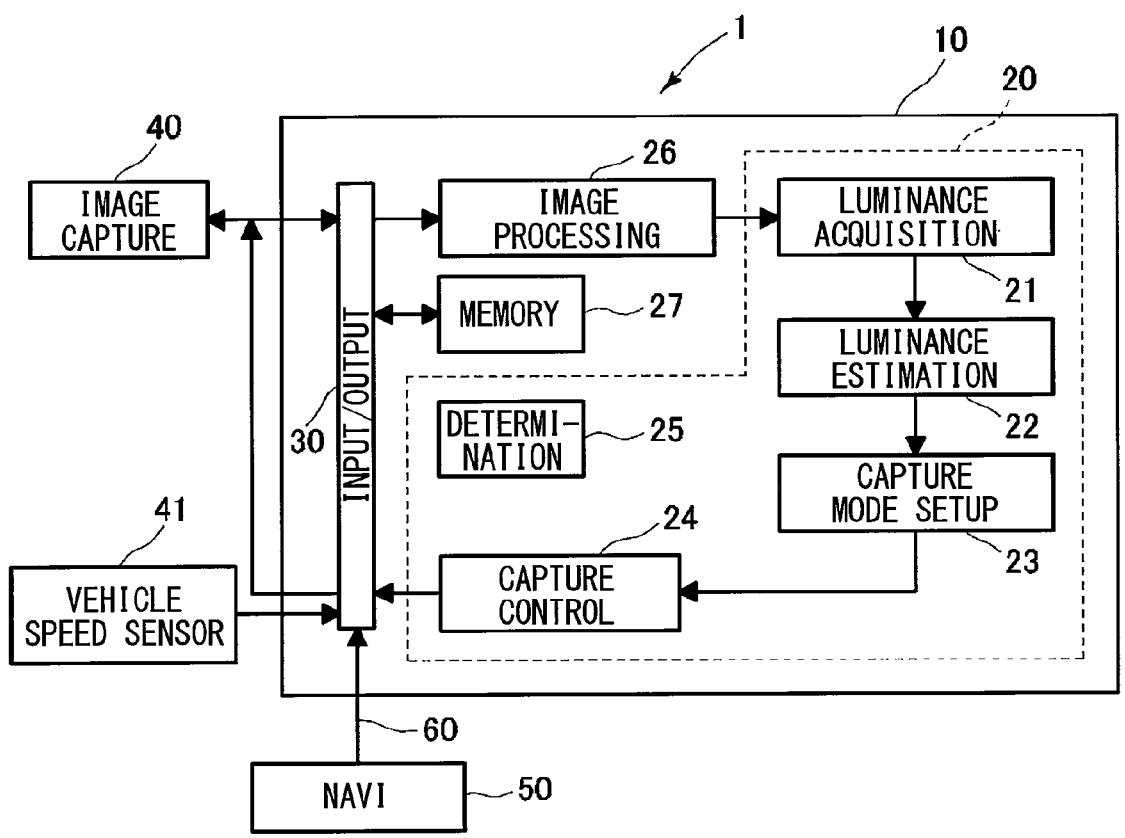
FIG. 1 is a diagram illustrating an example configuration of a vehicular image processing apparatus according to the present disclosure.

The following describes the vehicular image processing apparatus according to the present disclosure with reference to the accompanying drawings. As illustrated in FIG. 1, a vehicular image processing apparatus 1 to a vehicle includes a driver monitor ECU (hereinafter simply referred to as an "ECU") 10, an image capture portion 40 connected to the ECU 10, and a vehicle speed sensor 41 (also referred to as a vehicle speed detection portion) 41 to detect a vehicle speed. A navigation apparatus 50 may be connected to the ECU 10 via an in-vehicle LAN 60 so as to be capable of data communication.

The ECU 10 includes an arithmetic processing portion 20, an image processing portion 26, memory 27 (also referred to as a capture mode storage portion), and a signal input/output circuit (hereinafter abbreviated to as "I/F") 30 (also referred to as a map information acquisition portion).

The arithmetic processing portion 20 is also referred to as an arithmetic circuit 20 and includes a luminance acquisition section 21, a luminance estimation section 22, a capture mode setup section 23, a capture control section 24, and a determination section 25. The luminance acquisition section 21 determines a driver's face position (see Patent Literature 3 for details of the face position determination), for example, using a captured image processed in the image processing portion 26 and acquires the luminance from the driver's face image. The memory 27 stores reference data for each luminance in advance. The face image is compared with the reference data to acquire the luminance, for example.

Each section of the arithmetic processing portion 20 may include a CPU and various types of memory and may be configured as hardware such as one or more IC or ASIC modules or may be partly or wholly configured as software in the memory.

The luminance estimation section 22 references the luminance of face images chronologically stored in the memory 27 and determines whether or not the luminance varies cyclically. The capture mode setup section 23 settles the capture mode based on an estimation result from the luminance estimation section 22 (to be described in detail later). The capture control section 24 controls operation of the image capture portion 40 based on the capture mode settled by the capture mode setup section 23 (to be described in detail later).

Figure 6:
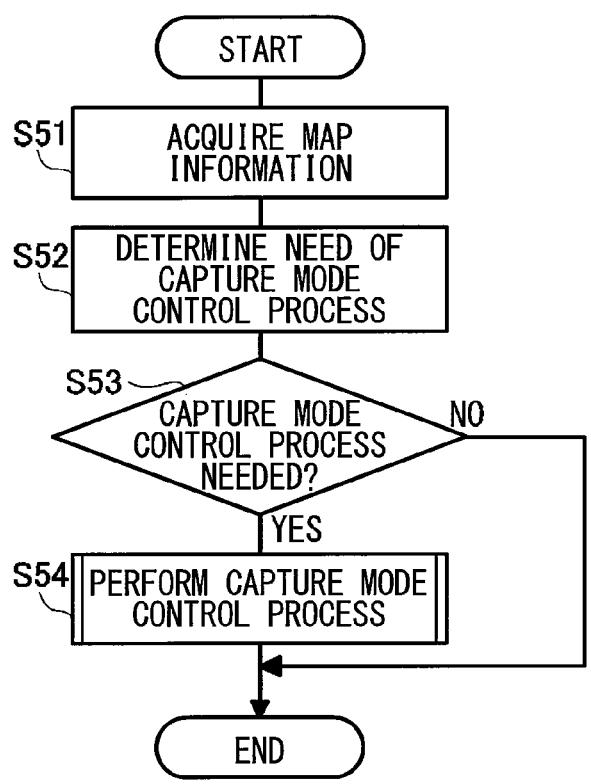
FIG. 6 is a flowchart diagram illustrating the capture mode control process reflecting the vehicle's current position.

The determination section 25 determines whether or not to perform a capture mode control process to be described later (see FIG. 6).

The image processing portion 26 uses a known pattern recognition technology to analyze an image captured by the image capture portion 40. For example, the image processing portion 26 applies a general digitization process to a captured image to convert the captured image into pixel-based digital multiple-value image data. The image processing portion 26 uses a general image processing technique to extract a targeted image portion (e.g., a driver's face) from the acquired multiple-value image data.

The memory 27 uses nonvolatile memory such as flash memory. The memory 27 stores a control program or data needed for operation of the vehicular image processing apparatus 1. The CPU included in the arithmetic processing portion 20 performs the control program to provide various functions as the vehicular image processing apparatus 1.

The signal input/output circuit 30 includes a waveform shaping circuit, an A/D conversion circuit, a D/A conversion circuit, and a voltage conversion circuit. The signal input/output circuit 30 is supplied with an output signal from the vehicle speed sensor 41. The signal input/output circuit 30 applies wave shaping or voltage conversion to the supplied signal as needed and then A/D-converts the signal into a value (digital value) that can be processed in the arithmetic processing portion 20.

The image capture portion 40 is provided as a camera using a known CMOS or CCD sensor, for example. An infrared camera may be used. The image capture portion 40 captures a capture target or an image of the capture target at a predetermined timing (e.g., a capture cycle) and outputs a captured image to the image processing portion 26. The capture target signifies a predetermined area in a vehicle compartment or an object present in the area near the driver's seat including a driver.

The navigation apparatus 50 uses a known technology to detect the vehicle's current position based on a received GPS signal, display the vehicle's current position on map data, and guide a route to a predetermined destination, for example. The navigation apparatus 50 outputs map information (to be described in detail later) about the vehicle's current position to the vehicular image processing apparatus 1.

The present application uses "information" as a countable noun as well as an uncountable noun.

Figure 2:
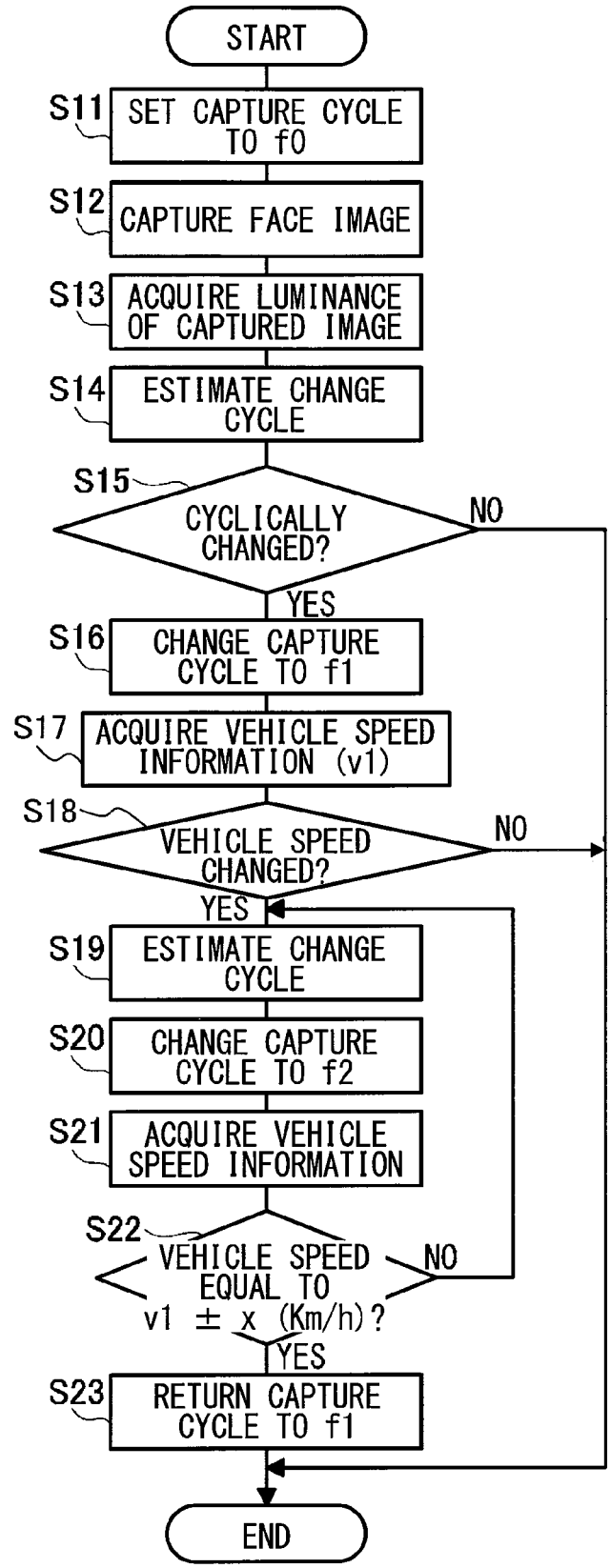
FIG. 2 is a flowchart diagram illustrating a capture mode control process.

With reference to FIG. 2, the following describes a capture mode control process performed in the arithmetic processing portion 20. The process is contained in the control program stored in the memory 27 and is repeatedly performed at a predetermined timing along with the other processes contained in the control program.

It is noted that a flowchart or the processing of the flowchart in the present application includes sections (also referred to as steps), each of which is represented, for instance, as S11. Further, each section can be divided into several sub-sections while several sections can be combined into a single section. Furthermore, each of thus configured sections can be also referred to as a device, module, or means. Each or any combination of sections explained in the above can be achieved as (i) a software section in combination with a hardware unit (e.g., computer) or (ii) a hardware section, including or not including a function of a related apparatus; furthermore, the hardware section (e.g., integrated circuit, hard-wired logic circuit) may be constructed inside of a microcomputer.

The capture mode setup section 23 sets a capture cycle to f0 (default value) (S11). The capture cycle signifies a cycle for the image capture portion 40 to capture an image, namely, a capture interval between adjacent images (e.g., images 101 and 102) in FIG. 3. Capture cycle f0 is set to 10 ms, for example.

The capture control section 24 controls the image capture portion 40 to capture a driver's face image at the above-mentioned capture cycle f0 (S12). The luminance acquisition section 21 acquires the luminance of the captured image (i.e., the driver's face image) from image data that is captured by the image capture portion 40 and is processed by the image processing portion 26 (S13). The memory 27 stores the luminance in association with the image capture timing. The capture timing may use a date (e.g., acquired from the navigation apparatus 50) or the system time (e.g., counted in the CPU).

The luminance estimation section 22 estimates a luminance change cycle of previous images stored in the memory 27 (S14). The details are as follows. The luminance estimation section 22 determines light and dark of a captured image. For example, the luminance estimation section 22 determines that the captured image is "light" if the captured image luminance exceeds a predetermined luminance threshold value. The luminance estimation section 22 determines that the captured image is "dark" if the captured image luminance is below the luminance threshold value.

The above-mentioned configuration may be defined to be equivalent to a luminance estimation section that estimates a cycle of changes in the captured image luminance so as to change the capture mode based on the cycle. The configuration can determine the capture mode according to a cycle of changes in the captured image luminance.

For example, suppose a single sequence of successions, and in a sequence the "light"state successively occurs m±2 times and then the "dark" state successively occurs n±2 times (m and n are positive integers and the minimum succession count is 0) and this sequence of successions repeats as many times as a predetermined count (e.g., the number of sequences reaches five). In such a case, the captured image luminance is assumed to exhibit a chronologically cyclical change or to vary longer than or equal to predetermined time at a given cycle. This cycle also needs to be calculated.

The above-mentioned configuration may be defined to be equivalent to the luminance estimation section that assumes that the luminance of the image changes cyclically in the case that: the luminance of a captured image exceeds a predetermined luminance threshold value and this state continues for a predetermined time period; and then the luminance of the image falls short of the luminance threshold value and this state continues for a predetermined time period. This configuration can relatively easily estimate a cyclic change in the luminance.

The luminance of the captured image may cyclically change for a predetermined time period or longer (S15: YES). In this case, the capture mode setup section 23 sets the capture cycle to f1. Capture cycle f1 is set to a value, which decreases the number of captured images that are assumed to be "dark" (S16).

The above-mentioned configuration may be defined to be equivalent to an image capture portion that captures a vehicle compartment at a predetermined capture cycle and a capture mode setup section that sets the capture cycle so as to prevent luminance variations in cyclically captured images. This configuration can prevent occurrence of a phenomenon in which the captured image repeats light and dark at a slow cycle.

In more detail, the above-mentioned configuration may be defined to be equivalent to the capture mode setup section that sets the capture cycle to be different from the one applied to the state where the captured image luminance cyclically changes.

The capture mode setup section 23 acquires vehicle speed information from the vehicle speed sensor 41 and assumes this vehicle speed to be v1 (S17). The capture mode setup section 23 stores vehicle speed v1 in association with the above-mentioned capture cycle f1 in the memory 27.

Afterward, the vehicle speed may change from v1 to v2 (S18: YES). In this case, the capture mode setup section 23 estimates a luminance change cycle based on an amount of vehicle speed change (S19). The amount of vehicle speed change is assumed to exceed x to be described later. Generally, decreasing the vehicle speed elongates the luminance change cycle. Increasing the vehicle speed shortens the luminance change cycle. The memory 27 may store map data indicating the relationship between the amount of vehicle speed change and an increased or decreased luminance change cycle. The capture mode setup section 23 may estimate the luminance change cycle with reference to the map data.

The capture mode setup section 23 changes the capture cycle to f2 based on the estimated luminance change cycle (S20). The capture mode setup section 23 stores capture cycle f2 in association with vehicle speed v2 in the memory 27. Obviously, capture cycle f2 is not set to approximate capture cycle f1.

The above-mentioned configuration may be defined to be equivalent to the following. A vehicle speed detection portion (41) is provided to detect a vehicle speed. When the vehicle speed changes, the luminance estimation section estimates a cycle of changes in the captured image luminance at the changed vehicle speed based on the amount of vehicle speed change. The capture mode setup section determines the capture mode for the image capture portion based on the estimation result from the luminance estimation section. The configuration can determine the capture mode for the image capture portion in a shorter time than the estimation from changes in the captured image luminance.

The capture mode setup section 23 acquires the vehicle speed information from the vehicle speed sensor 41 (S21). A difference between the vehicle speed and v1 described above may be smaller than or equal to x (S22: YES). In this case, the capture mode setup section 23 returns the capture cycle to f1 (S23 or S16) without estimating the capture cycle.

The above-mentioned configuration may be defined to be equivalent to the following. A capture mode storage portion (27) is provided to store vehicle speeds in association with capture modes for the image capture portion. In response to a change in the vehicle speed, the capture mode setup section enables the capture mode associated with the vehicle speed without allowing the luminance estimation section to estimate the luminance when the capture mode storage portion stores the changed vehicle speed. This configuration can determine the capture mode for the image capture portion in a short time.

Figure 3:
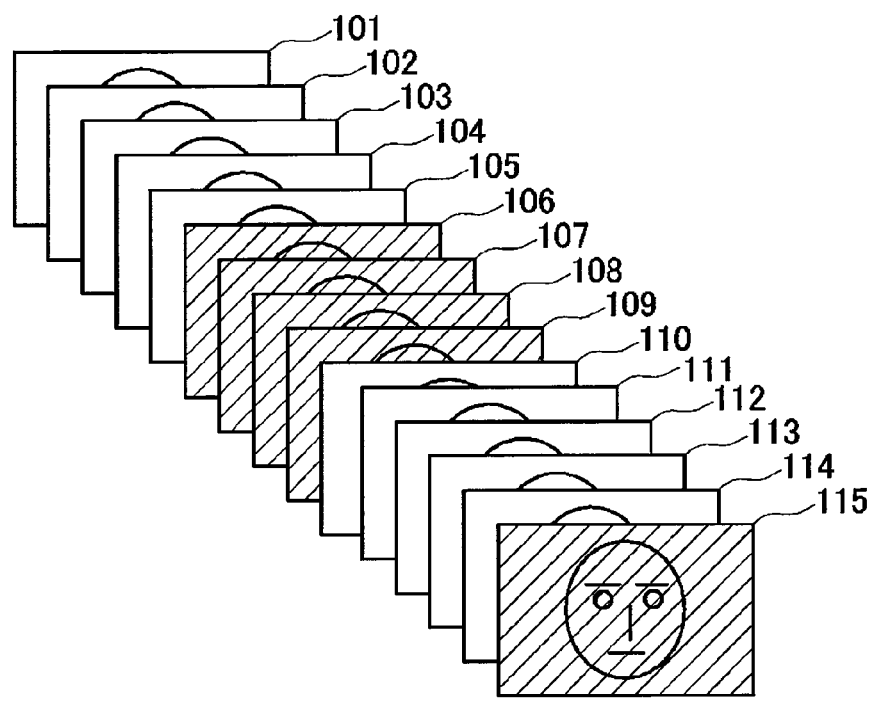
FIG. 3 is a diagram illustrating luminance changes in a captured image according to a prior art.
Figure 4:
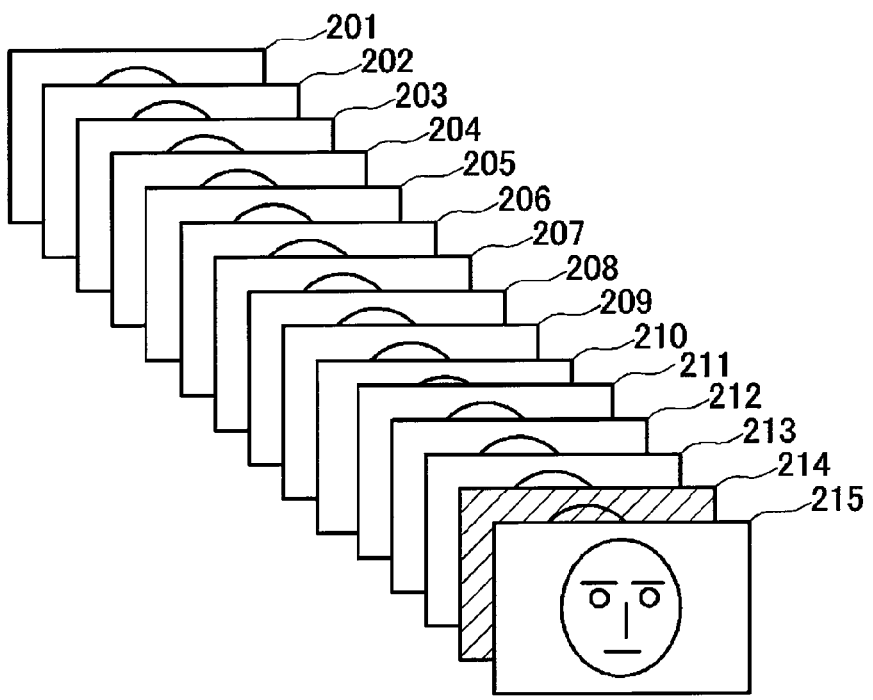
FIG. 4 is a diagram illustrating luminance changes in a captured image according to the present disclosure.

With reference to FIGS. 3 and 4, the following describes changes in the captured image luminance when the capture mode control process in FIG. 2 is performed. FIG. 3 chronologically illustrates changes in the captured image luminance according to a prior art. Captured image 101 is oldest. Captured image 115 is newest. FIG. 4 chronologically illustrates changes in the captured image luminance according to the present disclosure. Captured image 201 is oldest. Captured image 215 is newest.

As illustrated in FIG. 3, the captured images repeat light and dark at a slow cycle when the light-dark cycle of the captured image luminance approximates a multiple of the capture cycle. In FIG. 3, images 101 through 105 and images 110 through 114 represent "light" and images 106 through 109 and image 115 represent "dark." The light-dark cycle repeats based on a cycle, which may be defined as one sequence of successions, that causes five times of "light" (images 101 through 105) and four times of "dark" (images 106 through 109) while the next sequence starts from the image 110 of "light." The cycle differs from the light-dark cycle due to shadows resulting from the above-mentioned structures.

The present disclosure detects a repetition of light and dark and estimates a repetition cycle. The light-dark change may be assumed to cyclically repeat at the estimated cycle. In such a case, the capture cycle is determined to approximate a multiple of the light-dark cycle due to shadows resulting from the above-mentioned structures. The capture cycle is set to a different one. If the capture cycle does not approximate a multiple of the light-dark cycle due to shadows, the captured image luminance is assumed not to cyclically repeat light and dark.

The light-dark cycle of the captured image luminance used for FIG. 4 differs from that used for FIG. 3. Therefore, images other than image 214 are "light." The images other than image 214 indicate at least the luminance that exceeds the above-mentioned threshold value. This increases the number of captured images that can be used to accurately read the face state.

Figure 5:
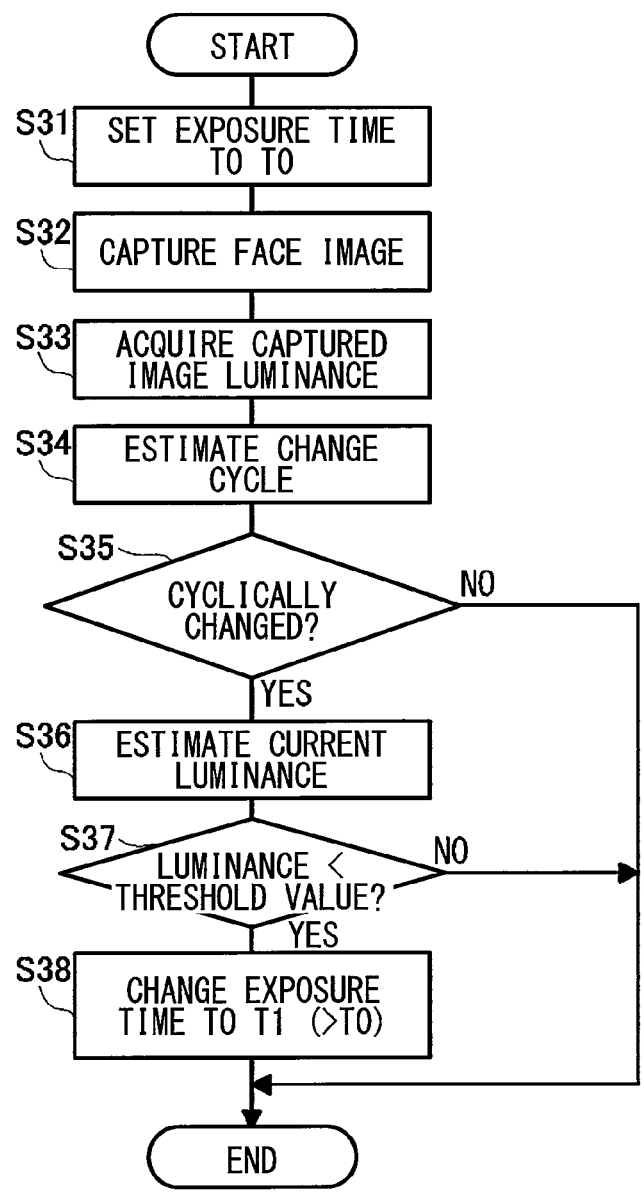
FIG. 5 is a flowchart diagram illustrating another example of the capture mode control process.

Another example of the capture mode control process will be described with reference to FIG. 5. This configuration may be defined to be equivalent to the following. The image capture portion captures a vehicle compartment at a predetermined exposing condition; the capture mode setup section varies the exposing condition based on an estimation result from the luminance estimation section. This configuration can prevent occurrence of a phenomenon in which the captured image repeats light and dark at a slow cycle. The configuration can also reduce uneven captured image luminance and provide a stable recognition result.

The capture mode setup section 23 applies T0 (default value) to the exposure time (e.g., a camera's shutter speed) for the image capture portion 40 to capture images (S31). The capture mode setup section 23 controls the image capture portion 40 so that the capture control section 24 captures a driver's face image using exposure time T0 as applied above (S32).

The luminance acquisition section 21 acquires the luminance of the captured image (i.e., the driver's face image) from captured images captured by the image capture portion 40 and processed by the image processing portion 26 (S33). Similarly to FIG. 2, the memory 27 stores the luminance in association with the image capture timing.

Similarly to FIG. 2, the luminance estimation section 22 estimates a luminance change cycle of previous images stored in the memory 27 (S34). The luminance estimation section 22 may determine that the captured image luminance varies longer than or equal to predetermined time at a given cycle (S35: YES). In this case, the luminance estimation section 22 estimates the captured image luminance at the next capture timing based on the luminance change cycle (S36).

The luminance estimation section 22 may estimate that the captured image luminance at the next capture timing falls short of the threshold value (i.e., determined to be "dark") (S37: YES). In this case, the capture mode setup section 23 sets the exposure time to T1. For example, exposure time T1 is set to be T1>T0 so as to decrease the number of captured images determined to be "dark."

The luminance estimation section 22 may estimate that the captured image luminance at the next capture timing exceeds the threshold value (i.e., determined to be "light") (S37: NO). In this case, the exposure time remains T0 as applied at S31 above.

Changes in the captured image luminance in FIG. 5 will be described with reference to FIGS. 3 and 4. As illustrated in FIG. 3, the captured images repeat light and dark at a slow cycle when the light-dark cycle of the captured image luminance approximates a multiple of the capture cycle. Namely, the "light" state successively occurs five times and then the "dark" state successively occurs four times.

In FIG. 4, suppose that the above-mentioned light-dark cycle of the captured image luminance is estimated at the timing before capturing image 201 and the "dark" state successively occurs four times before capturing image 201. In this case, the next five captured images (images 201 through 205) can be estimated to be "light." Therefore, the exposure time remains T0. When image 205 is captured, the "light" state successively occurs five times. Therefore, the four subsequent captured images (images 206 through 209) can be estimated to be "dark." In this case, the exposure time is set to T1. Similarly, images 210 through 214 can be estimated to be "light." This increases the number of (light) images capable of accurately reading the face state because images 206 through 209 identified as being "dark" according to the prior art are identified as being "light." This enables to acquire many images appropriate for the analysis and provide a stable recognition result.

It may be favorable to acquire map information about the vehicle's current position from the navigation apparatus 50 and perform the capture mode control process (FIG. 2 or 5) based on the map information. FIG. 6 illustrates an example. This configuration may be defined to be equivalent to the following. A map information acquisition portion (30) is provided to acquire map information containing the current position where the vehicle is traveling. A determination section (25) is provided to determine, based on the map information, whether or not to allow the capture mode setup section to enable the capture mode for the image capture portion. This configuration can enable the capture mode at a necessary location only, making it possible to provide a stable recognition result and reduce processing loads.

Map information is acquired from the navigation apparatus 50 (S51). The determination section 25 (see FIG. 1) determines whether or not the capture mode control process needs to be performed based on the map information (S52). The determination section 25 determines that the capture mode control process needs to be performed when at least one of the following conditions is satisfied.

The current position is detected in a tunnel.
The current position is detected in an underground structure.
The current position is detected in a forest zone.
Buildings, roadside trees, or street lights are lined along a road where the vehicle is traveling.
Bridge columns are lined along a road where the vehicle is traveling.

The capture mode control process (FIG. 2 or 5) is performed (S54) when the determination section 25 determines that the capture mode control process needs to be performed (S53: YES).

While the present disclosure has been described with reference to the embodiment, it is to be understood that the disclosure is not limited to the embodiment and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A vehicular image processing apparatus comprising:
an image capture portion that cyclically captures images of a vehicle compartment of a vehicle;
a luminance acquisition section that acquires a representative luminance value of each of the captured images captured by the image capture portion, the representative luminance value being representative luminance value of each of the captured images;
a luminance estimation section that performs, based on a chronological change in the representative luminance values of the captured images, an estimation of a chronologically cyclical change in representative luminance values of captured images that are to be captured subsequently by the image capture portion; and
a capture mode setup section that settles a capture mode of the image capture portion based on a result of the estimation of the chronologically cyclical change in the representative luminance values of the captured images,
wherein:
the luminance estimation section determines, as a first luminance value, the representative luminance value of one of the captured images when the representative luminance value of the one of the captured images is greater than a predetermined luminance threshold, and
the luminance estimation section determines, as a second luminance value, the representative luminance value of a different one of the captured images when the representative luminance value of the different one of the captured images is not greater than then predetermined luminance threshold;
the luminance estimation section determines that the representative luminance values of the captured images exhibit the chronologically cyclical change when a predetermined number of sequences occur,
each of the sequences being defined as (i) one of the first luminance value and the second luminance value continues in successively captured images captured for a first predetermined period of time, and then (ii) an other of the first luminance value and the second luminance value continues in successively captured images captured for a second predetermined period of time, and then changes back to (iii) said one of the first luminance value and the second luminance value of the first predetermined period of time;
the capture mode setup section settles the capture mode to decrease a number of captured images that are determined to be the second luminance value when the luminance estimation section determines that the representative luminance values of the successively captured images exhibit the chronologically cyclical change.

2. The vehicular image processing apparatus according to claim 1,
wherein the image capture portion captures the vehicle compartment at a first cycle of capture; and
wherein when the luminance estimation section determines that the luminance of the capture image exhibits the chronologically cyclical change, the capture mode setup section switches from the first cycle of capture into a second cycle of capture, the second cycle of capture suppressing variations in the luminance of the captured image.

3. The vehicular image processing apparatus according to claim 2, further comprising:

a vehicle speed detection portion that detects a vehicle speed of the vehicle,
wherein, in response to a change that changes the vehicle speed, the luminance estimation section performs an estimation of a cycle of changes in luminance of the captured image at the changed vehicle speed based on an amount of the change in the vehicle speed; and
wherein the capture mode setup section settles a capture mode of the image capture portion based on a result of the estimation performed by the luminance estimation section.

4. The vehicular image processing apparatus according to claim 3, further comprising:
a capture mode storage portion that stores a vehicle speed of the vehicle to be associated with a capture mode of the image capture portion,
wherein, in response to a change that changes the vehicle speed, in cases that the capture mode storage portion stores the changed vehicle speed, the capture mode setup section settles, as a capture mode, the capture mode with which the changed vehicle speed is associated in the capture mode storage portion, without an estimation in the luminance performed by the luminance estimation section.

5. The vehicular image processing apparatus according to claim 1,
wherein the image capture portion captures the vehicle compartment according to a predetermined exposing condition; and
wherein the capture mode setup section varies the exposing condition based on a result of an estimation performed by the luminance estimation section.

6. The vehicular image processing apparatus according to claim 1, further comprising:
a map information acquisition portion that acquires map information containing a current position where the vehicle is traveling; and
a determination section that determines based on the map information whether or not to cause the capture mode setup section to settle a capture mode of the image capture portion.

7. The vehicular image processing apparatus according to claim 1, wherein the first predetermined period of time can be different from the second predetermined period of time.

8. The vehicular image processing apparatus according to claim 1, wherein the first predetermined period of time covers a first predetermined plural quantity of successive captured images and the second predetermined period of time covers a second predetermined plural quantity of successive captured images.

9. The vehicular image processing apparatus according to claim 1, further comprising a determination section that determines whether or not to allow the capture mode setup section to enable the capture mode based on a current position of the vehicle in relation to a map information.

10. The vehicular image processing apparatus according to claim 1,
wherein the image capture portion captures the vehicle compartment according to a predetermined exposing condition; and
wherein the capture mode setup section varies the exposing condition for a plurality of luminance changes, based on the result of the estimation of the cyclical change.

11. The vehicular image processing apparatus according to claim 1, wherein:

the luminance estimation section determines that the chronologically cyclical change exists when the number of the sequences is at least five; and the capture mode setup section settles the capture mode responsive to the luminance estimation section determining that the chronologically cyclical change exists.

* * * * *